United States Patent [19]
Fontaine

[11] Patent Number: 4,763,395
[45] Date of Patent: Aug. 16, 1988

[54] LOCK CYLINDER LOADING TOOL AND METHOD OF USE

[76] Inventor: Jose Fontaine, P.O. Box 396, Quakertown, Pa. 18951

[21] Appl. No.: 46,642

[22] Filed: May 7, 1987

[51] Int. Cl.[4] .............................................. B23P 11/00
[52] U.S. Cl. ........................................ 29/436; 29/468; 29/253; 29/272
[58] Field of Search ................. 29/434, 436, 464, 468, 29/225, 253, 271, 272, 283

[56] References Cited

U.S. PATENT DOCUMENTS 3,664,007 5/1972 Schlage ................................ 29/271

*Primary Examiner*—Timothy V. Eley
*Attorney, Agent, or Firm*—Steele, Gould & Fried

[57] ABSTRACT

A tool and a method for loading pins into pin holes in the bore of the cylinder of a tumbler lock is disclosed. The tool is an elongated rod with two rod sections, a loading section and a handle section having a greater circumference than the rod section to form a shoulder. A contiguous groove runs lengthwise through both rod sections and includes perpendicular pin holes in the loading section. A tapered blade is provided to slide in the groove. In use, the pins are loaded into predetermined pin holes in the loading section. The loading section is inserted into the cylinder bore until the shoulder of the handle section prevents further forward motion and aligns the rod pin holes with matching pin holes in the cylinder. The blade is pushed towards the cylinder and urges the pins from the rod holes into the cylinder pin holes. With the blade holding the pins in the cylinder pin holes, the rod is turned so that the pins are now held in place by the rod itself. The lock plug is then inserted into the cylinder bore from the opposite end, temporarily mating with the rod end and pushing out the rod to replace it and hold the pins in their pin holes. The lock cylinder, loaded with pins and plug, is now ready to be placed in the door.

7 Claims, 2 Drawing Sheets

LOCK CYLINDER LOADING TOOL AND METHOD OF USE

BACKGROUND OF THE INVENTION

1. Field of the Invention

This invention relates to metal working and more particularly to means to assemble and relatively position plural work parts.

2. Description of the Prior Art

The central feature of the cylinder lock is a rotatable mounted plug or cylinder. In the locked position, a number of pin tumblers of different lengths are pressed down by springs to engage with holes in the cylinder, thereby preventing the plug/cylinder from rotating. When the key is inserted into the lock, the pin tumblers are raised by exactly the correct amount to bring their tops flush with the outer surface of the cylinder. The cylinder/plug is then free to rotate when the key is turned. The cylinder actuates the bolt, so that the door can be opened. If the wrong key is inserted, it will not raise all or any of the tumbler pins to the correct height, and the cylinder/plug cannot be rotated.

When a locksmith must repair or re-key a lock, replacing the pins and springs, he often needs to use several tools simultaneously. He must also work with very small pins and springs which fit into the small bores of the new lock cylinder. In order to do this he uses a vise to hold the cylinder or awkwardly holds all pieces in his two hands. Frequently, while manipulating the many pieces, the pins and springs fall out of their chambers before they can be locked into position.

In order to solve this problem, Schlage in U.S. Pat. No. 3,664,007 discloses a cylinder loading tool which utilizes three pieces: a rod with an elongated slot and axial pin holes, a sleeve, and a slide. In use, the rod is loaded with pins and springs., the springs extending outward slightly from the pin holes. The slide is urged forward in the slot and pushes down each spring as it reaches it. Once a spring is pushed down, the sleeve is positioned over it, holding the pin and spring in the hole. When all springs and pins are loaded and being held in place by manually holding the sleeve in the correct position, the cylinder is slipped over the rod, displacing the sleeve and covering the pins. The cylinder is then turned to release the springs and pins into the appropriate pin holes in the cylinder.

However, it is difficult to correctly judge the correct distance to insert the rod to insure that the correct pin goes into each predetermined pin hole. Even when the correct position is determined, it is difficult to keep the correct alignment while turning the rod in the cylinder to release the pins. Because the locksmith must hold the cylinder with one hand and the sleeve with another hand, he is not able to manipulate the slide. He needs an extra hand or a vise in order to smoothly use Schlage's tool—one hand to hold the cylinder, one hand to hold the rod and move the slide, and a third hand to position the sleeve.

There is, therefore, a need for a lock cylinder loading tool which quickly and easily lines up the pins in the correct cylinder holes and does not require the aid of another person to load the pins and springs into a lock cylinder.

SUMMARY OF THE INVENTION

The aforementioned prior art problems are obviated by the cylinder loading tool of this invention in which a hand held elongated bi-sectional rod includes pin holes and a blade to urge lock pins into preselected cylinder pin holes. A first rod loading section has a predetermined length and circumference which allows it to be inserted into the bore of a lock cylinder. It includes along its entire length a lengthwise groove of a predetermined depth and width, the groove also includes perpendicularly aligned radial pin holes extending from the groove to the outer circumference of the rod. The first rod loading section's proximal end includes a slot intended to mate with the end of a lock plug and its other end is joined to the second rod section. The second rod section serves as a handle and includes a groove aligned with the groove of the first section to form a continuous groove in which the blade slides. The second section has a circumference greater than that of the cylinder bore so that the second rod handle section acts as a shoulder stop to prevent further forward motion of the rod in the bore and aligns the rod pin holes with those of the cylinder bore.

The blade is generally rectangular in longitudinal cross section and includes a handle extension proximate its distal end , its proximal end tapering to aid in lifting the pins.

In use, the first rod loading section pin holes are loaded with a predetermined number of lock tumbler pins. A user holds the cylinder in one hand and the cylinder loading tool in the other hand. The proximal end of the rod loading section is inserted into the cylinder bore until the second rod handle section's shoulder stops forward motion. The pin holes of the rod and the cylinder bore are now aligned. With the thumb of his second hand, the user pushes the blade handle, urging the blade forward. As the blade's tapered end reaches the pins, its point lifts them up into the pin holes of the cylinder bore. If the pins do not move, the user rotates the cyliner slightly with his first hand until the first pin lifts up. The blade then easily slides forward, loading the rest of the pins into the cylinder bore pin holes. Then the user rotates the cylinder slightly, the pins then held in the bore pin holes because the blade and the rod prevent their falling out. The tool is then pushed from the cylinder bore from the other bore end by the lock's plug, the end of the lock plug and the proximal tool end mating, so that the plug replaces the rod to hold the pins in place. The plug loaded cylinder is then placed in the lock hole of the door.

It is, therefore, an object of this invention to provide a lock cylinder loading tool which one person can operate without use of a vice or other person.

It is another object of this invention to provide a lock cylinder loading tool which rapidly and handily loads the pins into a lock cylinder.

It is yet another object of this inventionn to provide a lock cylinder loading tool which is bi-sectional, one section acting as an aligning means and a stop for the other section.

It is still another object of this invention to provide a lock cylinder loading tool with a plurality of pin holes to align with any standard lock cylinder.

It is another object of this invention to provide a lock cylinder loading tool with a handled blade to allow a person to simultaneously hold the tool and push the blade with one hand.

It is a further object of this invention to provide a lock cylinder loading tool with one rod end slotted to mate with the protruding end of a lock plug.

These and other objects will be more readily ascertainable to one skilled in the art from a consideration of the following Figures, description and exemplary embodiments.

BRIEF DESCRIPTION OF THE DRAWING(S)

DETAILED DESCRIPTION OF THE PREFERRED EMBODIMENT(S)

Figure 1:
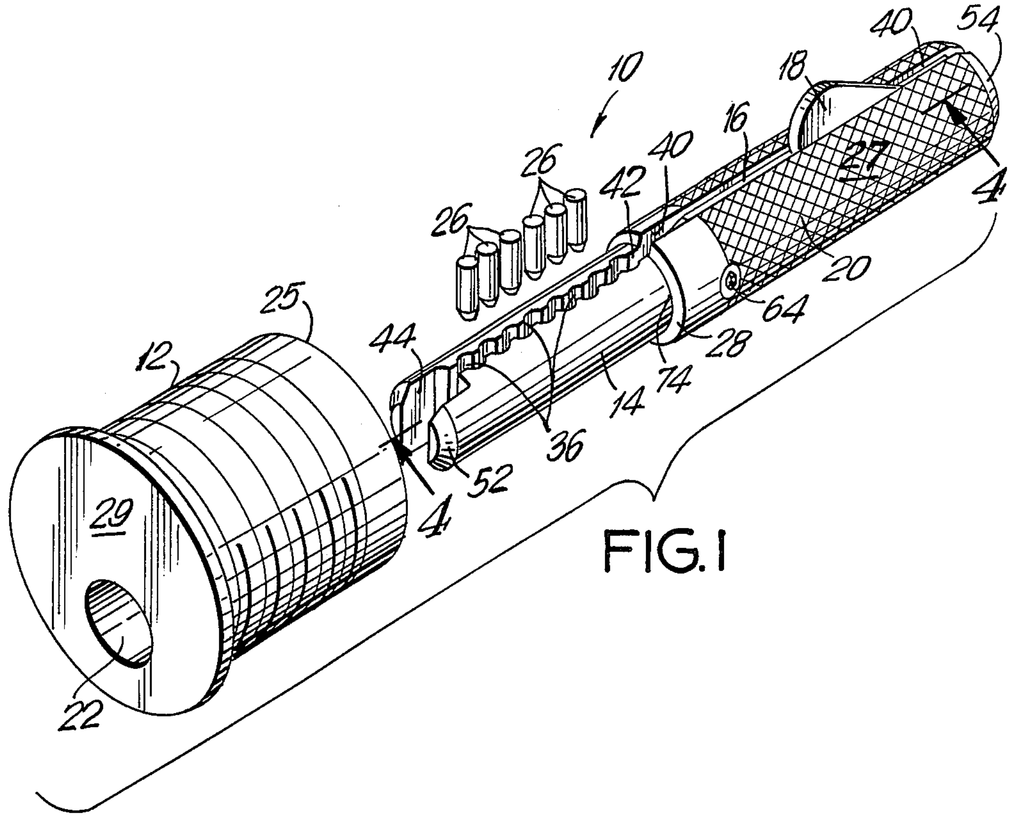
FIG. 1 is an exploded view showing the lock cylinder loading tool and the cylinder and pins of a pin tumbler lock.

Referring now to the drawings, and more particularly to FIG. 1, lock cylinder 12 is shown exploded with lock cylinder loading tool 10 and pins 26. Cylinder 12 has enlarged proximal end 29, bore 22 and distal end 25.

Lock cylinder tool 10 has rod loading section 14 and rod handle section 20. Rod loading section 14 has proximal end 52 with groove 44 and distal end 74. Rod handle section 20 has distal end 54, textured surface 27, and shoulder 28 ( which is the proximal end of rod handle section 20) which abuts end 74 of rod section 14. Rod handle section 20 is preferably textured with surface 27 to provide a sure grip. Rod section 20 also is seen with pin 64, which is explained in reference to FIGS. 4 and 5. Grooves 40 and 42 in rod section 20 and 14 respectively are seen to be receiving blade 16. Blade 16 has handle extension 18 at its distal end and pointed proximal end 19 with tip 73 (seen in FIGS. 4 and 5). Longitudinal groove 42 includes perpendicular pin holes 36 which extend from groove 42 to the outer circumference of rod section 14. Pin holes 36 are sized to receive pins 26, seen exploded. Although, eight pin holes are shown, only six pins are illustrated, it should be understood that not all locks use the same number of pin holes. For example, many locks have four, five, or six pin holes and need only four, five or six pins. However, eight pin holes 36 are necessary to allow for alignment of pin holes 36 with pin holes in cylinders of different lengths.

Figure 2:
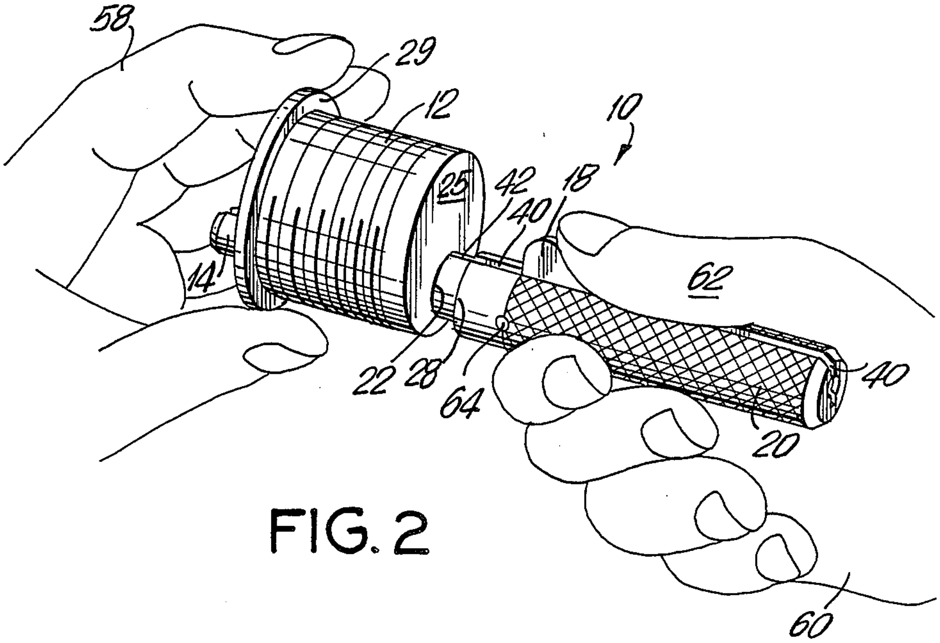
FIG. 2 is an isometric view of the lock cylinder loading tool of this invention in use inserted partially into a lock cylinder, one hand operating the tool, the other hand holding the cylinder.
Figure 3:
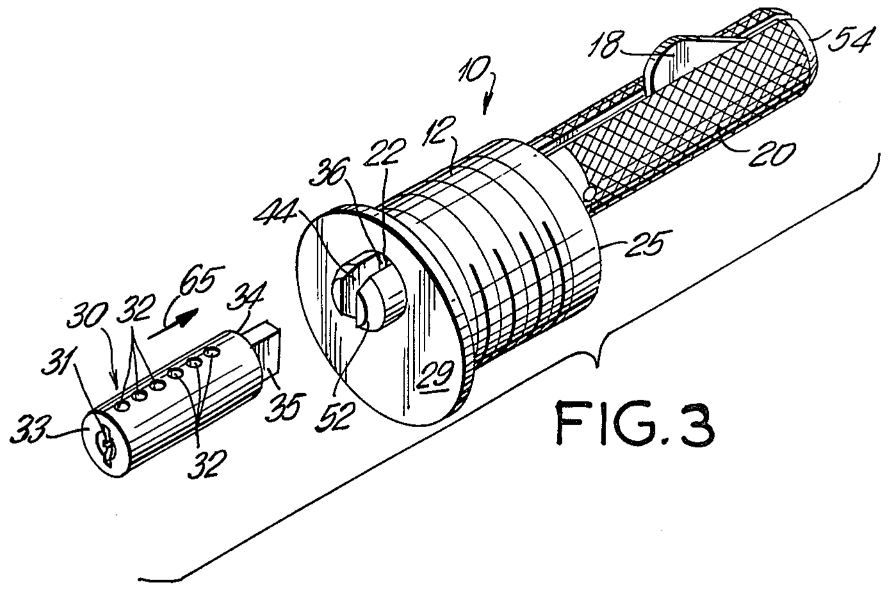
FIG. 3 is a view of the lock cylinder loading tool in a cylinder, the lock plug exploded.
Figure 5:
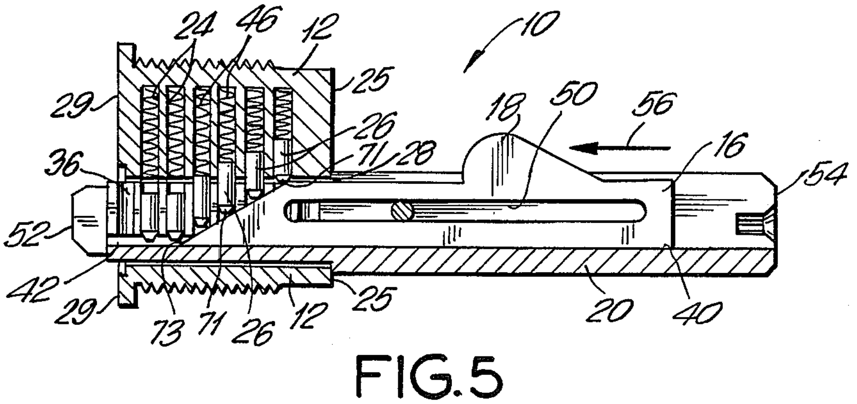
FIG. 5 is a longitudinal cross section of the device of this invention illustrating the pins being loaded into the cylinder bore pin holes.

Of particular importance in FIG. 1 is shoulder 28. Shoulder 28 is formed as the proximal end of rod section 20 by providing rod section 20 with a greater circumference than rod section 14. Thus, since rod section 14 is sized to be received in the bores of lock cylinders, rod shoulder 28 is larger than cylinder bore 22 and will act as a stop and means of alignment when tool 10 is inserted into cylinder bore 22, as illustrated in FIGS. 2 and 3. The length of rod section 14 and the provision of shoulder 28 are critical in the use of tool 10. When shoulder 28 abuts end 25 of cylinder 12, pin holes 36 will be aligned with pin holes in bore 22 ( as is illustrated in FIG. 5. There is no need, as in the prior art, for the user to push rod section 14 in and out of bore 22 in an effort to properly align the pin holes. Shoulder 28 stops forward motion of tool 10 in bore 22 at precisely the required distance to allow pin holes 36 to be aligned with bore pin holes. It is this automatic alignment which is the greatest advantage of tool 10 because it permits the user to insert the tool and align it properly with only one hand operating the tool, thereby eliminating the need for a vice or third hand. This advantage will be more fully illustrated in FIGS. 2 and 3 when the method of loading a lock cylinder is described.

Now referring to FIG. 2, the lock cylinder loading tool 10 of this invention is shown partially inserted into bore 22 of cylinder 12. Two hands are shown operating tool 10. For the purposes of clarity in describing the operation, hand 58 shall be designated as the first hand and hand 60 as the second hand. In operation, pins 26 (seen in FIG. 1) have been previously loaded into pin holes 36 (also seen in FIG. 1).

In order to load the pins into the cylinder bore holes, the user, with second hand 60 holding tool 10 and first hand 58 holding cylinder 12, inserts rod section 14, loaded with pins 26, into cylinder bore 22 from cylinder distal end 25. The pins remain in holes 36 (seen in FIG. 1), held there by the walls of bore 22 and rod section 14. Tool 10 is inserted until shoulder 28 touches cylinder end 25, automatically setting pin holes 36 in longitudinal alignment with the bore pin holes. Using thumb 62, the user pushes blade handle 18 so that blade 16 (only handle 18 visible in this view) moves along grooves 40 and 42 until tapered proximal end 19 with point 73 (seen in FIGS. 4 and 5) touches the first pin 26. The user then rotates cylinder 12 with hand 58, maintaining steady forward pressure on blade 16 to urge blade 16 against the first pin 26. As soon the rotation of cylinder 12 radially aligns the pin holes in the bores to a position immediately above rod pin holes 36, blade 16 continues forward, urging each pin 26 into the predetermined pin hole in bore 22.

Now referring to FIG. 3, the completion of the operation of pin loading a cylinder is illustrated. Cylinder 12, with tool 10 inserted into bore 22, has been loaded with pins 26, as evidenced by empty pin hole 36. Cylinder 12 is rotated with first hand 58 until the walls of bore 22 hold the pins in the bore pin holes. Proximal end 52 of tool 10 (proximal end of rod loading section 14) extends from proximal end 29 of cylinder 12 and distal end 54 of tool 10 (distal end of rod handle section 20) extends from cylinder end 25. Now holding tool 10 in second hand 60, blade handle 18 steadied by thumb 62 and cylinder 12 held on tool 10, a user grasps plug 30 with first hand 58. Plug 30 has pin holes 32, key end 33 with key hole 31, and protruding end 34 with protrusion 35 which mates with slot 44 in proximal end 52 of tool 10. As first hand 58 pushes plug 30 against tool 10 in the direction of arrow 65, plug 30 enters bore 22 and replaces tool 10. Plug 30 now holds pins 26 in their desired cylinder pin holes until a key is inserted into key hole 31 to operate the lock. Cylinder 12, loaded with plug 30, is now inserted into the door.

The entire operation described in FIGS. 2 and 3 is done very quickly with the aid of tool 10. No pins escape from the desired pin holes and only two hands are necessary for the quick and easy operation of the pin loading tool. It should be noted that the springs may be loaded in the same manner as the pins, or they may be loaded separately by hand before use of the tool of this invention.

Figure 4:
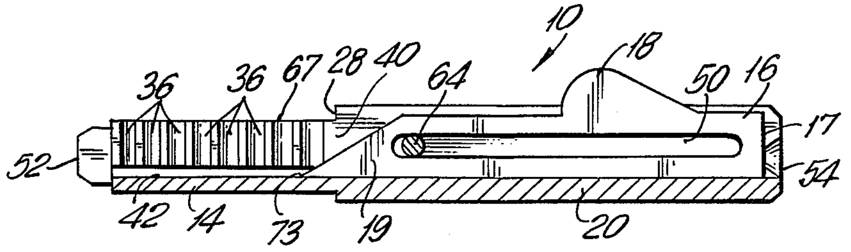
FIG. 4 is a cross section taken on lines 4—4 of FIG. 1 showing the blade in the contiguous groove of the two rod sections.

Now referring to FIGS. 4 and 5, cross sections illustrate tool 10 and cylinder 12 with tool 10 inserted, respectively. Tool 10 is seen with loading section 14 and handle section 20. Rod loading section 14 includes proximal tool end 52 and perpendicular apertures 36 which extend from groove 42 to outer circumference 67. Rod handle section 20 includes shoulder 28, tool distal end 54, and slot 40 in which blade 16 is set. Blade 16 has tapered proximal end 19, tip 73, extended handle section 18 at distal end 17, and slot 50 through which pin 64 extends.

FIG. 4 illustrates tool 10 before it has been loaded with pins 26. Of special interest in FIG. 4 is pin 64 which extends through rod section 20 into blade slot 50. Pin 64 insures that blade end 19 will remain flat in grooves 40 and 42 and that blade 16 will not escape or misalign itself in grooves 40 and 42.

FIG. 5 includes a cross section of cylinder 12 to illustrate the operation of blade 16. Cylinder 12 is seen with proximal end 29, distal end 25, cylinder pin holes 24, and springs 46. As blade 16 is pushed with handle 18 in the direction of arrow 56, tip 73 of blade 16 catches tips 71 of pins 26, urging them upward into cylinder pin holes 24 which have been previously loaded with springs 46. As blade 16 moves forward in grooves 40 and 42 so that its full height extends the total height of rod loading section 14, blade 16 holds pins 26 in pin holes 24 against springs 46. Blade 16 continues to hold the pins in their pin holes until cylinder 12 is rotated, as described in reference to FIGS. 2 and 3.

There are several variations which can be practiced in the scope of this invention. First, although it is preferred that tool 10 be constructed of stainless steel, it is possible to construct it of heavy duty plastic or other durable material.

Second, shoulder 28 is preferred to be straight, as illustrated, however, to accomodate some knob locks, it may be bevelled, as long as it has a greater circumference that of the cylinder bore, it is within the scope of this invention.

Tool 10 has been illustrated with eight pin holes and six pins. Many cylinders call for fewer pins, and tool 10 can accōmodate such an arrangement.

Also, although pin 64 is illustrated, its elimination is still within the scope of this invention.

There are many advantages to the lock cylinder loading tool of this invention. Chiefly, it allows one person, working alone, to quickly and easlily load pins in cylinder pin holes.

Second, because of shoulder 28, the tool of this invention provides automatic alignment of cylinder pin holes with rod pin holes.

Having now illustrated and described my invention, it is not intended that such description limit this invention, but rather that this invention be limited only by reasonable interpretation of the appended claims.

What is claimed is:

1. A lock cylinder loading tool for hand held use without reference to an external vise in loading pins and springs into a pin tumbler lock cylinder, said pin tumbler lock including pins and springs, a plug with two ends, a key end and a protruding back end, and a cylinder with an axial bore and a plurality of axially aligned radial pin holes spaced apart along an axial length and intersecting said axial bore, said loading tool comprising:

(a) a first rod loading section of a predetermined length and circumference to allow said rod loading section to be slidably received in said cylinder's bore and to align with said cylinder pin holes, said rod loading section including a proximal and a distal end, said rod loading section including, along its entire length, a longitudinal groove of a predetermined depth and width, said groove including a plurality of aligned radial pin holes perpendicular to said groove and extending from said groove to said rod loading section's circumference, said groove terminating at said proximal rod end in a groove sized to mate with said plug's protruding back end;

(b) a second rod handle section having a circumference greater than said cylinder's bore and a proximal end abutting said distal end of said rod loading section to form a shoulder stop therewith, said rod handle section including, along its entire length, a longitudinal groove of sufficient depth to be contiguous with said rod loading section's groove; and (c) an elongated blade including a proximal tapered end and a distal rearward end, said blade being of a length at least equal to the length of said rod loading section and slidably mounted longitudinally in said handle section groove so that, in use, said proximal blade end slides forward and operates to lift said pins from said rod's pin holes during engagement therewith.

2. The lock cylinder loading tool according to claim 1 wherein said blade includes, proximate its distal end, a vertical extension extending through said handle groove to serve as a blade handle.

3. The lock cylinder loading tool according to claim 1 wherein said rod handle section includes, additionally, a textured surface to provide a non-slip grip.

4. The lock cylinder loading tool according to claim 1 wherein said blade includes, additionally, a lengthwise slot and wherein said rod handle section includes a radial pin proximate said shoulder, said pin being of sufficient depth and position to intersect said blade slot, said pin and slot operating as a slide path and stop to prevent disengagement of said blade from said rod handle section.

5. The lock cylinder loading tool according to claim 1 wherein said tool is steel.

6. A method for loading pins into a cylinder of a pin tumbler lock, said method comprising:

(a) providing a cylinder loading tool with proximal and distal ends and including two rod sections and a blade, (i) a proximal rod loading section of a predetermined length and circumference to allow said rod loading section to be slidably received in a lock cylinder's bore and to align with a lock cylinder bore's pin holes, said rod loading section including along its entire length a longtudinal groove of a predetermined depth and width, said groove including a plurality of aligned radial pin holes perpendicular to said groove and extending from said groove to said rod loading section's circumference, said groove terminating at said tool's proximal end in a cut-away sized to mate with a lock plug's protruding back end;

(ii) a distal rod handle section having a circumference greater than said cylinder's bore and a first end abutting said other end of said rod loading section to form a shoulder stop therewith, said rod handle section including, along its entire length, a longitudinal groove of sufficient depth to be contiguous with said rod loading section's groove; and (iii) an elongated blade including a proximal tapered end and a distal rearward end, said distal end including a blade handle, said blade being of a length at least equal to the length of said rod loading section and slidably mounted longitudinally in said handle section groove;

(b) loading a predetermined number of differently sized lock tumbler pins into predetermined pin holes in said loading tool;

(c) providing a pin tumbler lock including proximal and distal ends, pins and springs, a plug with two ends, a key end and a protruding back end, and a cylinder with an axial bore, proximal and distal ends, and a plurality of axially aligned radial pin holes spaced apart along an axial length and intersecting said axial bar;

(d) holding said lock cylinder with a first hand and said loading tool with a second hand;

(e) sliding said rod loading section into said lock cylinder's axial bore from said cylinder's distal end until said rod handle section's shoulder stops forward movement of said tool in said cylinder and thereby aligns said rod loading section's pin holes with said cylinder pin holes;

(f) pushing said blade handle forward, with the thumb of said second hand, to urge said blade through said rod handle section groove and into said rod loading section grooves;

(g) engaging each said pin with said blade's tapered end and urging each said pin into its predetermined spring loaded pin hole in said lock cylinder until all said pins are in their respective cylinder pin holes, said blade, as it moves forward in said tool, holding saidp ins in said cylinder pin holes;

(h) rotating said tool in said cylinder bore with said pins held in said cylinder pin holes by said blade and said tool retained in said cylinder bore;

(i) holding said tool in said second hand with said cylinder held on said rod loading section;

(j) inserting, with said first hand, said lock's plug into said cylinder's bore from said cylinder's proximal end, said tool's proximal end mating with said plug's protruding back end;

(k) pushing said tool from said cylinder bore with said plug, said first hand pushing said plug, said second hand holding said loaded cylinder on said tool, said pins and springs remaining in said cylinder pin holes and held therein by said plug; and, (l) inserting said loaded cylinder, with said plug in said bore ,into said lock.

7. The method according to claim 6 including, additionally, before step (a), manually loading predetermined lock cylinder pin holes with a predetermined number of springs before loading said pins.

* * * * *